US005614112A

United States Patent [19]
Peru et al.

[11] Patent Number: 5,614,112
[45] Date of Patent: Mar. 25, 1997

[54] INSTALLATION FOR POSITIONING EDGE TO EDGE AND WELDING BY MEANS OF A LASER BEAM AT LEAST TWO SHEET BLANKS

[75] Inventors: Gilles Peru; Francis Sauvage, both of Dunkerque; Yvon Le Roy, Le Doulieu; Charles Sion, Camphin-en-Carembault, all of France

[73] Assignee: Sollac, Puteaux, France

[21] Appl. No.: 226,860

[22] Filed: Apr. 13, 1994

[30] Foreign Application Priority Data

Apr. 28, 1993 [FR] France ................................. 93 05043

[51] Int. Cl.⁶ .............................. B23K 26/02; B23K 37/04
[52] U.S. Cl. .............................. 219/121.63; 219/121.82; 219/102; 219/103; 219/161
[58] Field of Search ........................ 219/121.63, 121.64, 219/121.82, 101, 102, 103, 104, 158, 161; 228/5.7, 44.3, 49.4, 26

[56] References Cited

U.S. PATENT DOCUMENTS

| | | |
|---|---|---|
| 2,705,514 | 4/1955 | Reece . |
| 4,721,241 | 1/1988 | Yuasa et al. .............................. 228/5.7 |
| 4,841,907 | 6/1989 | Otsuka . |
| 4,912,295 | 3/1990 | Arimochi et al. ....................... 219/104 |
| 5,169,051 | 12/1992 | Noé .......................................... 228/5.7 |
| 5,399,834 | 3/1995 | Guth ..................................... 219/121.63 |

FOREIGN PATENT DOCUMENTS

| | | |
|---|---|---|
| 0483652 | 5/1992 | European Pat. Off. . |
| 3409178 | 11/1984 | Germany . |
| 362675 | 12/1972 | U.S.S.R. ................................ 228/49.4 |

Primary Examiner—Teresa J. Walberg
Assistant Examiner—J. Pelham
Attorney, Agent, or Firm—Oblon, Spivak, McClelland, Maier & Neustadt, P.C.

[57] ABSTRACT

An installation for positioning edge to edge and welding by means of a laser beam at least two sheet blanks comprises means for supporting and positioning a first sheet blank in a horizontal reference plane, means for positioning the edge to be welded of the first sheet blank on the axis of the laser beam, means for maintaining the edge to be welded of the first sheet blank, means for clamping the first sheet blank, means for supporting and positioning at least one second sheet blank, means for maintaining the edge to be welded of the second sheet blank against the edge to be welded of the first sheet blank, means for clamping with a sectorized pressure the second sheet blank, means for exerting a lateral and sectorized pressure on the edges to be welded of the sheet blanks, and a welding unit employing a laser beam movable along the joint plane of the sheet blanks to be welded.

18 Claims, 3 Drawing Sheets

INSTALLATION FOR POSITIONING EDGE TO EDGE AND WELDING BY MEANS OF A LASER BEAM AT LEAST TWO SHEET BLANKS

BACKGROUND OF THE INVENTION

The present invention relates to an installation for positioning edge to edge and welding by means of a laser beam at least two sheet blanks.

The welding by means of a laser beam of at least two sheet blanks has opened up considerable industrial possibilities, in particular in the production of butt-welded parts, for example for the automobile industry.

Indeed, sheet blanks with a butt joint therebetween, i.e. assembled edge to edge without overlapping, and welded by means of a laser beam retain all their press-forming capability.

The sheet blanks may be of different geometrical shapes and/or of different thicknesses and may even be of different grades of steel.

In order to achieve a correct butt welding by means of a laser beam of two sheet blanks so that the press-forming capacity of the welded sheet blanks remains optimum, the sheet blanks to be welded must be disposed with their edges butting against each other without gaps and, in the case of sheet blanks of different shapes, their longitudinal positioning with respect to one another must be perfect.

Further, it is essential to ensure, on one hand, a perfect lateral positioning of the sheet blanks so that the joint plane of the two sheet blanks is located on the axis of the laser beam and, on the other hand, a longitudinal and lateral relative positioning or registering of said sheet blanks during their feed so as to maintain the joint plane on the axis of the laser beam.

Further, the butt welding of at least two sheet blanks by means of a laser beam must satisfy very strict requirements of precision, shape and position of said sheet blanks to be welded.

Indeed, the quality of the weld joint partly depends on the precision in the position of the sheet blanks and in the quality of contact in the region of the joint plane between said sheet blanks.

If the quality of the contact in the region of the joint plane is incorrect, i.e. if the clearance is excessive, the welded joint presents a collapse, and even holes, and the welded joint is discontinuous in this case.

In order to ensure a minimum clearance in the region of the joint plane of the sheet blanks so as to obtain a good quality of the welded joint, it is possible to improve the quality of the shearing of the sheets and thereby limit the undulations of the cutting edges and ensure an improved contact between the sheet blanks and better control this clearance between said sheet blanks.

However, to obtain such a result, it is necessary to invest in highly expensive and very precise shearing machines or to employ double shearing machines which permit simultaneously shearing with the same blade the two sheet blanks to be butt joined.

It is also possible to exert a lateral pressure on the sheet blanks in the direction toward the joint plane of said sheet blanks so as to crush the crests of the undulations of the sheared edges to be welded.

The latter solution is employed increasingly in industrial installations for welding by means of a laser beam.

For this purpose, industrial installations, termed continuous installations, are known which permit the reception of sheet blanks, the positioning of said sheet blanks with respect to each other and with respect to the axis of the laser beam during their feed in the direction toward said laser beam, then which permit maintaining this registering sheet blank position during their travel and ensure the welding of the sheet blanks and their discharge.

In the event that it is necessary to have a different lateral pressure in accordance with the point at which said pressure is exerted, for example in the case of butt joined sheet blanks having hollows or notches or in the case where two sheet blanks having a thickness or type which is different from a third sheet blank are butt joined, the use of a continuous installation is delicate, since it is then necessary to control the pressurization of each pressure applying element in accordance with the position of the sheet blanks in the installation.

Such an operation requires a very precise control and a complicated operation.

For carrying out such welding operations industrial installations, termed static installations, are known in which the butt joined sheet blanks are fixed and the welding unit is movable along the joint plane of said sheet blanks to be welded.

Generally, these installations comprise devices for maintaining the sheet blanks which employ for each sheet blank vertical clamping systems constituted for example by clamping jaws in one unit.

But these clamping systems have the drawback of deteriorating the surfaces of the sheet blanks and exerting a uniform pressure on said sheet blanks.

Thus, in the case of the welding of a plurality of sheet blanks of different thicknesses, as the pressure exerted by the clamping systems is uniform, the quality of the welded joint is usually poor.

Further, these clamping systems do not include means for regulating the pressure as a function of the length to be welded so that it is not possible to apply the desired pressure.

SUMMARY OF THE INVENTION

An object of the invention is therefore to provide an installation for positioning edge to edge and welding by means of a laser beam at least two sheet blanks whereby it is possible to obtain a good weld quality and exert on said sheet blanks a lateral contact pressure adapted to the parameters of the sheet blanks to be welded and to the preparation of the edges to be welded of said sheet blanks.

The invention therefore provides an installation for the butt joining and welding by means of a laser beam at least two sheet blanks, characterized in that it comprises:

means for supporting and positioning a first sheet blank in a horizontal reference plane, means for positioning the edge to be welded of said first sheet blank on the axis of the laser beam, means for maintaining the edge to be welded of the first sheet blank on the axis of the laser beam, means for clamping the first sheet blank, means for supporting and positioning at least one second sheet blank in said horizontal reference plane, means for maintaining the edge to be welded of said second sheet blank against the edge to be welded of said first sheet blank, means for clamping at a sectorized pressure said second sheet blank, means for exerting a lateral and sectorized pressure on the edges to be welded of said sheet blank, and a welding unit employing a laser beam movable along a joint plane of said sheet blanks to be welded.

According to other features of the invention:

the means for supporting and positioning the first sheet blank comprise at least one fixed lower shoe bearing against a support table and extending in the direction parallel to the joint plane of said sheet blanks, said lower shoe defining a continuous surface of contact with the lower face of said first sheet blank, the means for positioning the edge to be welded of the first sheet blank comprise a longitudinal and withdrawable stop disposed vertically so that the plane containing its lateral face in facing relation to the fixed lower shoe is coincident with the axis of the laser beam, the means for maintaining the edge to be welded of the first sheet blank on the axis of the laser beam comprise at least one vertically movable upper shoe extending in a direction parallel to the joint plane of said sheet blanks, said upper shoe defining a continuous contact surface with the upper face of said first sheet blank and being disposed in facing relation to said fixed lower shoe, the means for clamping the first sheet blank comprise at least one jack or cylinder device adapted to exert on the upper shoe a vertical pressure for clamping said first sheet blank between said upper shoe and the lower shoe, the means for supporting and positioning said second sheet blank comprise a series of independent lower shoes which are juxtaposed and extend in a direction parallel to the joint plane of said sheet blanks, said lower shoes forming a substantially continuous surface of contact with the lower face of said second sheet blank and each being movably mounted on a support table in a direction perpendicular to the joint plane of said sheet blanks, the means for maintaining the edge to be welded of said second sheet blank against the edge to be welded of said first sheet blank comprise a series of independent upper shoes which are juxtaposed and extend in a direction parallel to the joint plane of said sheet blanks, said upper shoes forming a substantially continuous surface of contact with the upper face of said second sheet blank and each being disposed in facing relation to a shoe of said series of lower shoes, each shoe of said series of upper shoes is movable, on one hand, vertically and, on the other hand, in a direction perpendicular to the joint plane of said sheet blanks, the means for clamping at a sectorized pressure said second sheet blank comprise at least one jack or cylinder device associated with each shoe of said series of upper shoes and adapted to exert on said shoe a vertical pressure for clamping said second sheet blank between said shoe and the corresponding shoe of the series of lower shoes, the means for exerting a lateral clamping with a sectorized pressure of the edges to be welded of said sheet blanks comprise at least one jack or cylinder device associated with each shoe of the series of lower shoes and adapted to exert on said shoe a pressure exerted in a direction perpendicular to the joint plane of said sheet blanks.

BRIEF DESCRIPTION OF THE DRAWINGS

Features and advantages of the invention will be apparent from the following description which is given solely by way of example with reference to the accompanying drawings in which.

DESCRIPTION OF THE PREFERRED EMBODIMENTS

Figure 1:
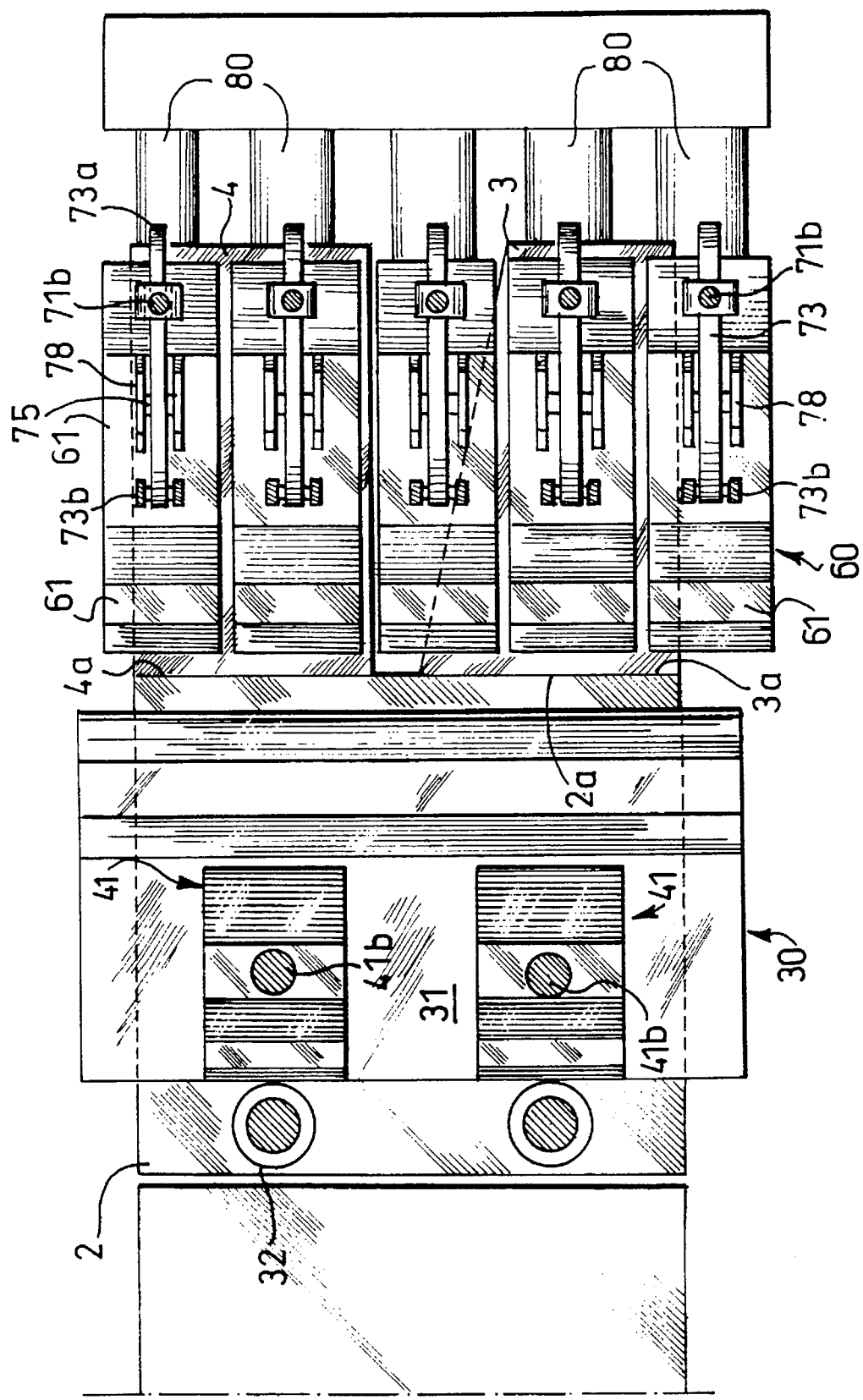
FIG. 1 is a diagrammatic top plan view of an installation according to the invention.

The installation shown diagrammatically in the Figures is adapted to position edge to edge and weld by means of a laser beam 1 at least two sheet metal blanks 2, 3 and 4 having different geometrical shapes and/or different thicknesses and even different grades of steel, for example for the automobile industry.

In the embodiment described hereinafter, the installation according to the invention is adapted to position edge to edge and weld three sheet metal blanks 2, 3 and 4, the edges to be welded 3a and 4a of the sheet blanks 3 and 4 being applied against the edge to be welded 2a of the sheet blank 1.

For this purpose, the installation shown diagrammatically in the Figures comprises:

a lateral table 5 for supporting sheet blank 2, a lateral table 6 for supporting sheet blanks 3 and 4, means 10 for supporting and positioning the sheet blank 2 in a horizontal reference plane, means 20 for positioning the edge to be welded 2a of the first sheet blank 2 on the axis of the laser beam 1, means 30 for maintaining the edge to be welded 2a of the sheet blank 2 on the axis of the laser beam 1, means 40 for clamping the sheet blank 2, means 50 for supporting and positioning the sheet blanks 3 and 4 in said horizontal reference plane, means 60 for maintaining the edges to be welded 3a and 4a of the sheet blanks 3 and 4 against the edge to be welded 2a of the sheet blank 2, means 70 for clamping the sheet blanks with a sectorized pressure, ie. pressure in sectors, means 80 for exerting a sectorized lateral pressure on the edges to be welded 2a, 3a and 4a of the sheet blanks 2, 3 and 4, and a welding unit including a laser beam 1 movable along the joint plane of the sheet blanks 2, 3 and 4 to be welded.

The means 10 for supporting and positioning the first sheet blank 2 comprise at least one fixed lower shoe 11 bearing against a support table 12 and extending in a direction parallel to the joint plane of the sheet blanks 2, 3 and 4.

This lower shoe 11 defines a continuous surface of contact with the lower face of the sheet blank 2.

The lower shoe 11 bears by its lateral face 11a opposed to the face 11b in facing relation to the joint plane of the sheet blanks 2, 3 and 4, against at least one stop means 13 connected to the support table 12 and constituted for example by rollers.

This stop means 13 permits preventing the sliding of the lower shoe 11 in a direction perpendicular to the joint plane of the sheet blanks 2, 3 and 4 when a lateral pressure is exerted on said sheet blanks 2, 3 and 4, as will be subsequently understood.

The means 20 for positioning the edge to be welded 2a of the sheet blank 2 comprise a longitudinal and retractable stop 21.

To this end, the stop 21 is connected to a mechanism 22 having an eccentric and is disposed vertically so that the joint plane passing through its lateral face 21a in facing relation to the lower shoe 11 is coincident with the axis of the laser beam 1.

The eccentric mechanism 22 may be replaced by double-acting cylinder devices which directly actuate the stops 21 guided in vertical guideways.

The means 30 for maintaining the edge to be welded 2a of the sheet blank 2 on the axis of the laser beam 1 comprise at least one vertically movable upper shoe 31 extending in a direction parallel to the joint plane of the sheet blanks 2, 3 and 4.

This upper shoe 31 defines a surface of continuous contact with the upper face of the sheet blank 2 and is disposed in facing relation to the lower shoe 11.

The lower shoe 11 and the upper shoe 31 may be replaced by a plurality of juxtaposed shoes forming substantially continuous surfaces of contact with the sheet blank 2.

The means 40 for clamping the first sheet blank 2 comprise at least one cylinder device 41 adapted to exert on the upper shoe 31 a vertical pressure for clamping the sheet blank 2 between the upper shoe 31 and the lower shoe 11.

The cylinder device 41 comprises a body 41a carried by a beam 42 extending in a direction parallel to the upper shoe 31 and a vertically movable rod 41b connected to the upper shoe 31.

The upper shoe 31 bears by its lateral face 31a remote from the lateral face 31b in facing relation to the joint plane of the sheet blanks 2, 3 and 4 against at least one stop means 32 connected to the beam 42 and formed for example by rollers.

This stop means 32 prevents a sliding of the upper shoe 31 when a lateral pressure is exerted on the sheet blanks 2, 3 and 4.

The assembly formed by the beam 42, the cylinder device 41, the upper shoe 31 and the stop means 32 may be mounted to be vertically movable or pivotable to permit the positioning of the sheet blank 2 on the lower shoe 11.

The means 50 for supporting and positioning the sheet blanks 3 and 4 comprise a series of independent lower shoes 51 juxtaposed in such manner as to form a substantially continuous surface of contact with the lower face of the sheet blanks 2 and 3.

These lower shoes 51 extend in a direction parallel to the joint plane of the sheet blanks 2 and 3.

Further, the lower shoes 51 are each mounted to be movable on a support table 52 in a direction perpendicular to the joint plane of the sheet blanks 2, 3 and 4.

Each shoe 51 comprises two pins 53 projecting from its lower face. Each pin 53 extends into an opening 54 provided in the support table 52 for guiding the corresponding lower shoe 51 when it is transversely displaced with respect to the joint plane of the sheet blanks 2, 3 and 4.

The means 60 for maintaining the edges to be welded 3a and 4a of the sheet blanks 3 and 4 against the edge to be welded 2a of the sheet blank 2 comprise a series of independent upper shoes 61 which are juxtaposed in such manner as to form a substantially continuous surface of contact with the upper face of the sheet blanks 3 and 4.

These upper shoes 61 extend in a direction parallel to the joint plane of the sheet blanks 2, 3 and 4 and are each disposed in facing relation to a lower shoe 51.

Each upper shoe 61 is movable on one hand vertically and on the other hand in a direction perpendicular to the joint plane of the sheet blanks 2, 3 and 4.

The means 70 for clamping with a sectorized pressure the sheet blanks 3 and 4 comprise at least one cylinder device 71 associated with each upper shoe 61.

Each cylinder device 71 is adapted to exert on a corresponding upper shoe 61 a vertical pressure which is so determined as to clamp the sheet blanks 3 and 4 between the upper shoes 61 and the lower shoes 51.

Each cylinder device 71 comprises a body 71a carried by a beam 72 extending in a direction parallel to the series of upper shoes 61 and a vertically movable rod 71b connected to the corresponding upper shoe 61 by a connecting means comprising a V-shaped lever 73.

This lever 73 has a first end portion 73a pivotally mounted on the free end portions of the rod 71b of the corresponding cylinder device 71 by means of an oblong opening 74 provided in the lever and a second end portion 73b pivotally mounted on the beam 72 carrying the corresponding cylinder device 71.

The lever 73 further comprises a pivot pin 75 located between the end portions 73a and 73b of the lever 73 and provided with a roller 76 disposed in an opening 77 provided in a yoke 78 connected to the corresponding upper shoe 61.

The distance between the first end portion 73a of the lever 73 and pivot pin 75 is greater than the distance between the second end portion 73b of the lever 73 and the pivot pin 75 so as to increase the pressure exerted on the upper shoe 61 by the corresponding cylinder device 71 when clamping the sheet blanks 3 and 4.

Figure 2:
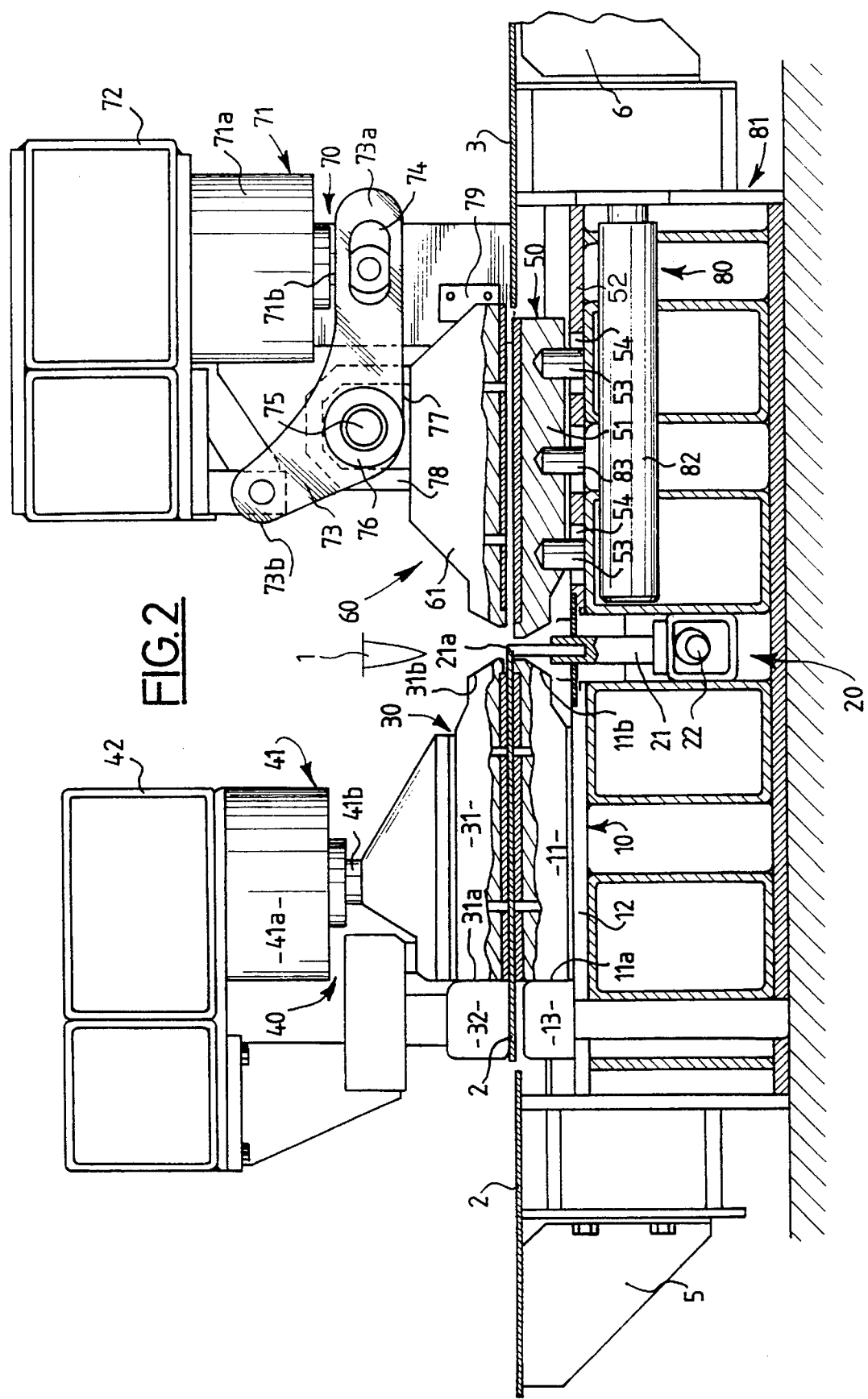
FIG. 2 is a diagrammatic cross-sectional view of the installation according to the invention in which the means for clamping the second sheet blank are in the open position.

As shown in FIG. 2, each shoe 61 is in a raised position and bears against a stop 79 so as to maintain it horizontal.

The assembly comprising the beam 72, the cylinder devices 71, the levers 73, the upper shoes 61 and the stops 79 may be raised or be pivotally mounted in such manner as to raise the upper shoes 61 to enable the sheet blanks 3 and 4 to be positioned on the lower shoes 51.

The point at which the yoke 78 is fixed on each upper shoe 61 is slightly rearwardly offset from said upper shoe 61 so that, upon their descent, the upper shoes 61 are inclined in a direction toward the joint plane of the sheet blanks 2, 3 and 4 and come to be progressively applied against the sheet blanks 3 and 4.

The means 80 for exerting a lateral and sectorized pressure on the edges to be welded 2a, 3a and 4a of the sheet blanks 2, 3 and 4 comprise at least one cylinder device 81 associated with each lower shoe 51.

Each cylinder device 81 is adapted to exert on each respective lower shoe 51 a given pressure directed in a direction perpendicular to the joint plane of the sheet blanks 2, 3 and 4.

Each cylinder device 81 comprises a horizontally movable rod 82 connected to the respective lower shoe 51 by at least one pin 83 which extends through the support table 52.

The installation according to the invention operates in the following manner.

First of all, the operator raises the upper shoe 31 and the upper shoe 61, the stop 21 being in a raised position as shown in FIG. 2.

The operator positions the sheet blank 2 on the lower shoe 11 in such manner that the edge to be welded 2a of this sheet blank 2 comes to be applied against the stop 21 so that said edge to be welded is on the axis of the laser beam 1.

Thereafter, the operator causes the upper shoe 31 to descend and puts the cylinder devices 41 under pressure which act on the upper shoe 31 in such manner as to clamp the sheet blank 2 between the upper shoe 31 and the lower shoe 11 and maintain the edge to be welded 2a of said sheet blank 2 on the axis of the laser beam 1.

Figure 3:
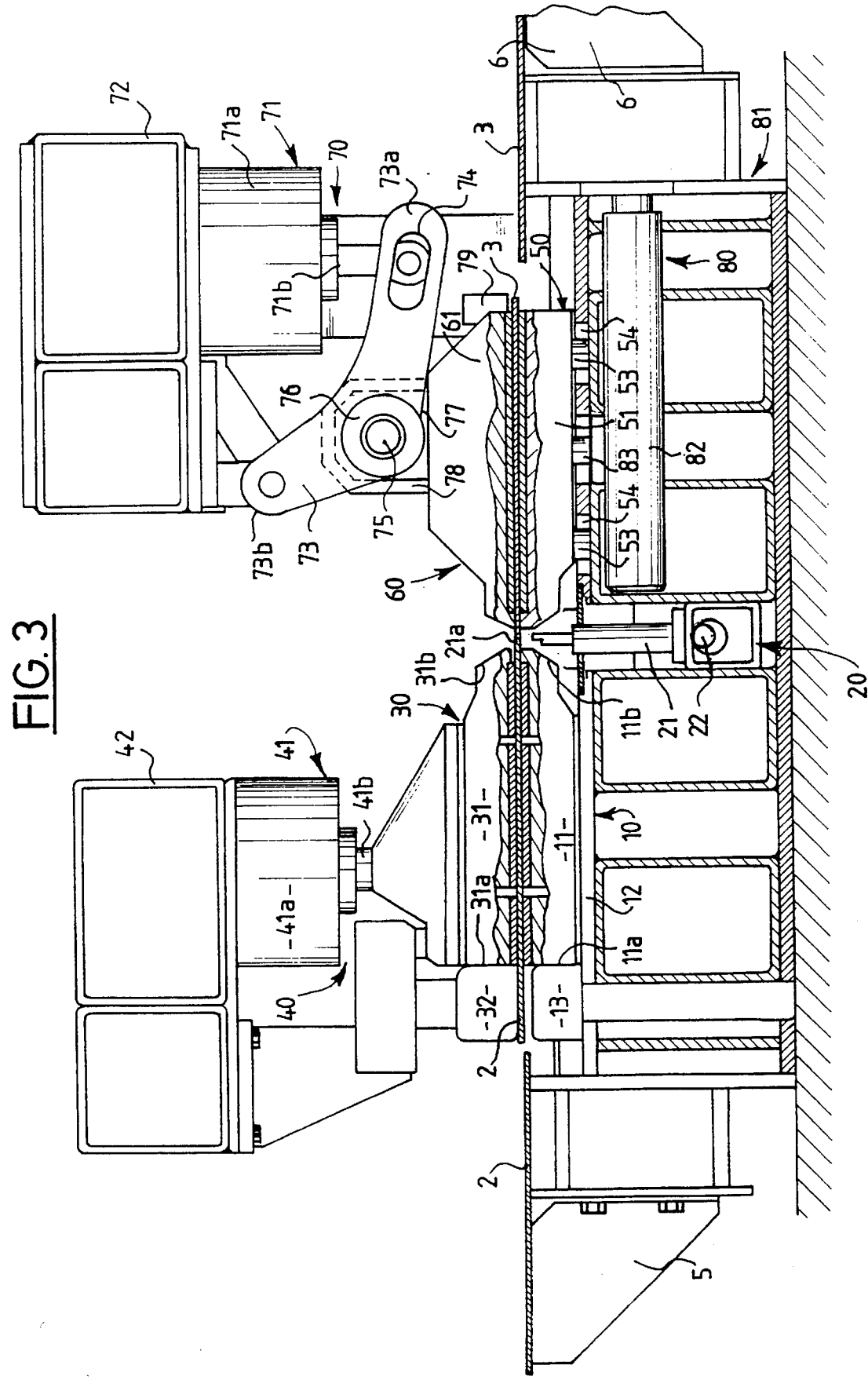
FIG. 3 is a diagrammatic cross-sectional view of the installation according to the invention in which the means for clamping the second sheet blank are in the closed position.

The stop 21 is then retracted as shown in FIG. 3 and the operator positions the sheet blanks 3 and 4 on the lower shoes 51 so that the edges to be welded 3a and 4a of these sheet blanks are applied against the edge to be welded 2a of the sheet blank 2.

After the positioning of the sheet blanks 3 and 4, the operator causes the upper shoes 61 to descend and causes the cylinder devices 71 to be put under pressure.

The descent of the rod 71b of each cylinder device 71 causes the lever 73 to pivot about its opposed end portion 73b so that the roller 76 comes to bear against the upper face of the corresponding upper shoe 61.

Thus, each roller 76 exerts under the action of a cylinder device 71 and a lever 73 a pressure on an upper shoe 61 so as to clamp the sheet blanks 3 and 4 between the shoes 51 and 61 and maintain the edges to be welded 3a and 4b of said sheet blanks 3 and 4 against the edge to be welded 2a of the sheet blank 2, i.e. on the axis of the laser beam 1.

The lever 73 amplifies by the leverage effect the force exerted on the sheet blanks 3 and 4 through the upper shoes 61. This arrangement permits producing a pressure force having a vertical component and a tangential component, resulting from the adherence and the vertical force, permitting a lateral pressure to be exerted on the sheet blanks 2, 3 and 4 to be butt joined.

The clamping pressure exerted by each shoe 61 on the sheet blanks 3 and 4 is adjustable and may be determined in accordance with the characteristics and/or the thickness of the sheet blanks 3 and 4.

In order to ensure a minimum of clearance between the edges to be welded 2a, 3a and 4a of the sheet blanks 2, 3 and 4, the operator puts the cylinder devices 81 under pressure.

The rod 82 of each cylinder device 81 acts, through the pin 83, on the corresponding lower shoe 51 which is shifted in a direction perpendicular to the joint plane of the sheet blanks 2, 3 and 4 and exerts a lateral pressure on the edges to be welded 2a, 3a and 4a.

The lateral displacement of the lower shoe 11 and of the upper shoe 31 is prevented by the rollers 13 and 32 respectively.

The lateral pressure exerted by each cylinder device 80 is adjustable and may be determined in accordance with the characteristics and/or the thickness of the sheet blanks 2, 3 and 4 so as to avoid a buckling of the latter and an overlapping in the region of the joint plane.

Thereafter, the operator causes the displacement of the welding unit in such manner that the laser beam 1 is moved over the joint plane of the sheet blanks 2, 3 and 4 and welds the edges 2a, 3a and 4a of said sheet blanks.

The installation according to the invention has many advantages.

Indeed, the installation according to the invention permits avoiding the deterioration of the surfaces of the sheet blanks, owing to the multiplication of the surfaces of contact between the clamping means and said sheet blanks, and reducing the difficulties involved in bringing these sheet blanks into butting relation.

Further, the installation according to the invention permits applying variable forces on the sheet blanks by means of independent cylinder devices.

Lastly, the installation according to the invention permits taking up locally excessive clearances and achieving a weld of perfect quality, even in the case of the welding of more than two sheet blanks of different thicknesses.

What is claimed is:

1. An installation for positioning edge to edge and welding by means of a laser beam a plurality of sheet blanks, the installation comprising:

means for supporting and positioning a first sheet blank in a horizontal reference plane, comprising at least one fixed lower shoe;

means for positioning an edge to be welded of said first sheet blank on an axis of said laser beam, comprising a vertically disposed, longitudinally extending and retractable stop having a lateral face which is in facing relation to said lower shoe and contained in a plane coincident with said axis of said laser beam;

means for maintaining said edge to be welded of said first sheet blank on the axis of the laser beam, comprising at least one vertically movable upper shoe;

means for clamping said first sheet blank;

means for supporting and positioning at least one second sheet blank against said edge to be welded of said first sheet blank, comprising a series of juxtaposed independent lower shoes, each of said lower shoes being mounted to be movable in a direction perpendicular to a joint plane of said sheet blanks;

means for maintaining an edge to be welded of said at least one second sheet blank against said edge to be welded of said first sheet blank, comprising a series of juxtaposed independent upper shoes;

means for clamping with a sectorized pressure said at least one second sheet blank;

means for exerting a lateral and sectorized pressure on said edges to be welded of said first sheet blank and said at least one second sheet blank; and a welding unit employing a laser beam movable along the joint plane of said first sheet blank and said at least one second sheet blank to be welded.

2. An installation according to claim 1, wherein said means for supporting and positioning said first sheet blank comprises a support table, at least one fixed lower shoe bearing against said support table and extending in a direction parallel to said joint plane of said sheet blanks, said lower shoe defining a continuous surface of contact with a lower face of said first sheet blank.

3. An installation according to claim 2, comprising stop means connected to said support table, said lower shoe having a first lateral face bearing against said stop means and a second lateral face opposed to said first lateral face in facing relation to said joint plane of said sheet blanks.

4. An installation according to claim 1, wherein said means for positioning said edge to be welded of said first sheet blank comprises a vertically disposed, longitudinally extending and retractable stop having a lateral face which is in facing relation to a lower shoe and contained in a plane coincident with said axis of said laser beam.

5. An installation according to claim 1, wherein said means for maintaining said edge to be welded of said first sheet blank on said axis of said laser beam comprises at least one vertically movable upper shoe extending in a direction parallel to said joint plane of said sheet blanks, said upper shoe defining a surface of continuous contact with an upper face of said first sheet blank and being disposed in facing relation to a lower shoe.

6. An installation according to claim 5, wherein said means for clamping said first sheet blank comprises at least one cylinder device adapted to exert a vertical pressure on said upper shoe so as to clamp said first sheet blank between said upper shoe and said lower shoe.

7. An installation according to claim 6, comprising a beam extending in a direction parallel to said upper shoe, said cylinder device comprising a body carried by said beam and a vertically movable rod connected to said upper shoe.

8. An installation according to claim 7, comprising stop means connected to said beam, said upper shoe having a first lateral face bearing against said stop means and a second lateral face opposed to said first lateral face and in facing relation to said joint plane of said sheet blanks.

9. An installation according to claim 1, comprising a support table, said means for supporting and positioning said at least one second sheet blank comprising a series of juxtaposed independent lower shoes extending in a direction parallel to the joint plane of said at least one second sheet blank, said lower shoes defining a substantially continuous surface of contact with a lower face of said at least one second sheet blank, and each lower shoe mounted to be movable on said support table in a direction perpendicular to said joint plane of said sheet blanks.

10. An installation according to claim 9, wherein said means for maintaining the edge to be welded of said at least one second sheet blank against the edge to be welded of said first sheet blank comprises a series of juxtaposed independent upper shoes extending in a direction parallel to said joint plane of said sheet blanks, said upper shoes defining a substantially continuous surface of contact with an upper face of said at least one second sheet blank and each being disposed in facing relation to a respective lower shoe.

11. An installation according to claim 10, wherein each upper shoe is movable both vertically and in a direction perpendicular to said joint plane of said sheet blanks.

12. An installation according to claim 10, wherein said means for clamping with a sectorized pressure said at least one second sheet blank comprises at least one cylinder device associated with each upper shoe and adapted to exert on said upper shoe a vertical pressure for clamping said at least one second sheet blank between said upper shoe and the respective lower shoe.

13. An installation according to claim 12, comprising a beam extending in a direction parallel to said series of upper shoes, said at least one cylinder device comprising a body carried by said beam and a vertically movable rod connected to the respective upper shoe.

14. An installation according to claim 13, comprising connecting means for increasing the pressure exerted by said cylinder device connecting said rod of said cylinder device to said respective upper shoe.

15. An installation according to claim 14, wherein said connecting means comprises a V-shaped lever having a first end portion pivotally mounted on a free end portion of said rod by means of an oblong opening provided in said lever, a second end portion pivotally mounted on said beam carrying said body of said cylinder device, a yoke connected to said respective upper shoe and defining an opening, a pivot pin located between said end portions of said lever, and a roller rotatively mounted on said pin and disposed in said opening in said yoke.

16. An installation according to claim 15, wherein a distance between said first end portion of said lever and said pivot pin is greater than a distance between said second end portion of said lever and said pivot pin.

17. An installation according to claim 10, wherein said means for exerting lateral and sectorized pressure on the edges to be welded of said sheet blanks comprises at least one cylinder device associated with each lower shoe and adapted to exert on said lower shoe a pressure directed in a direction perpendicular to said joint plane of said sheet blanks.

18. An installation according to claim 17, wherein said cylinder device comprises a horizontally movable rod connected to the respective lower shoe by at least one pin.

* * * * *